March 22, 1960
I. L. WOODY
2,929,190
LAWN MOWER WITH ADJUSTABLE ROLLER
Filed June 6, 1957
2 Sheets-Sheet 1
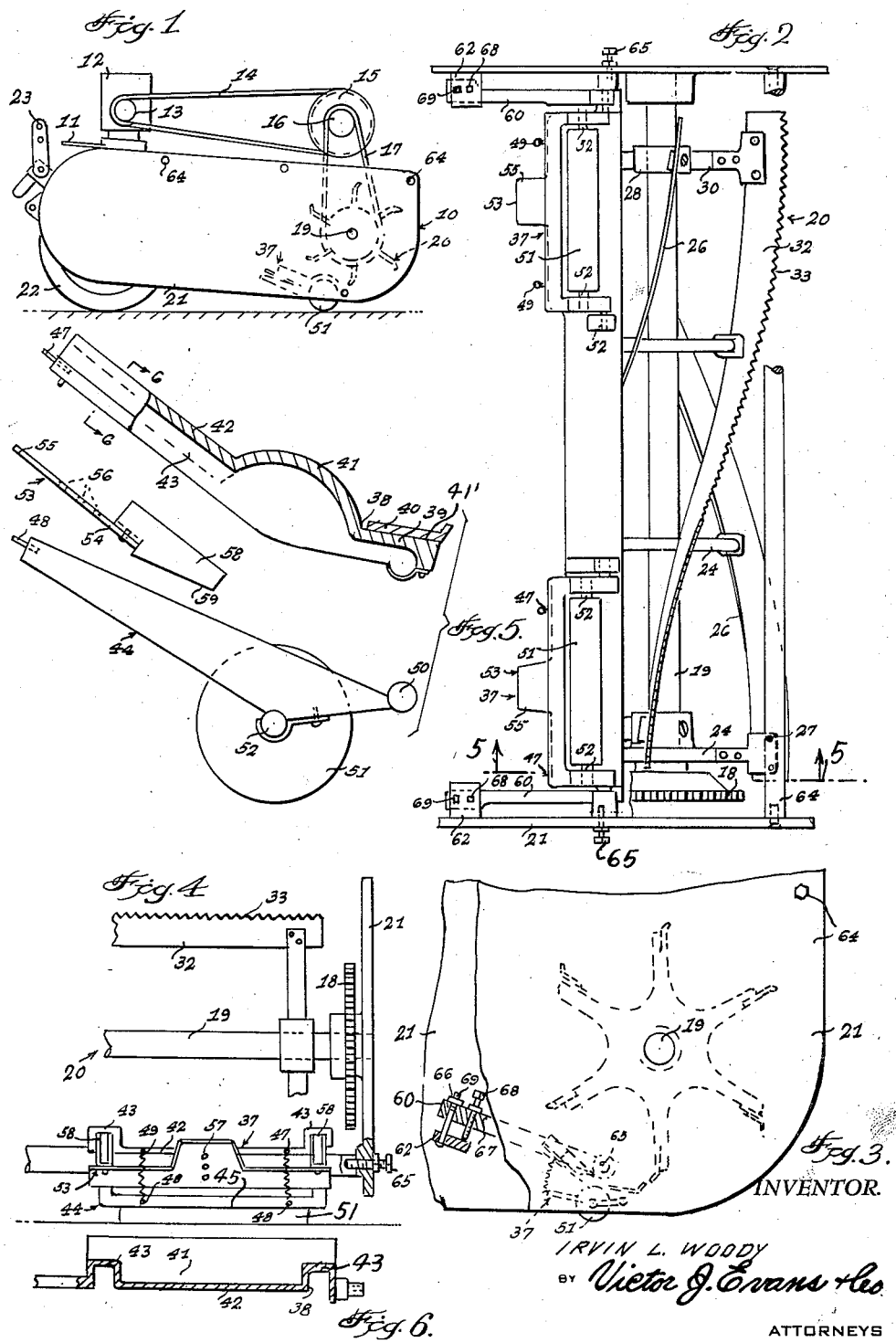
INVENTOR.
IRVIN L. WOODY
BY Victor J. Evans & Co.
ATTORNEYS March 22, 1960     I. L. WOODY     2,929,190
LAWN MOWER WITH ADJUSTABLE ROLLER
Filed June 6, 1957     2 Sheets-Sheet 2
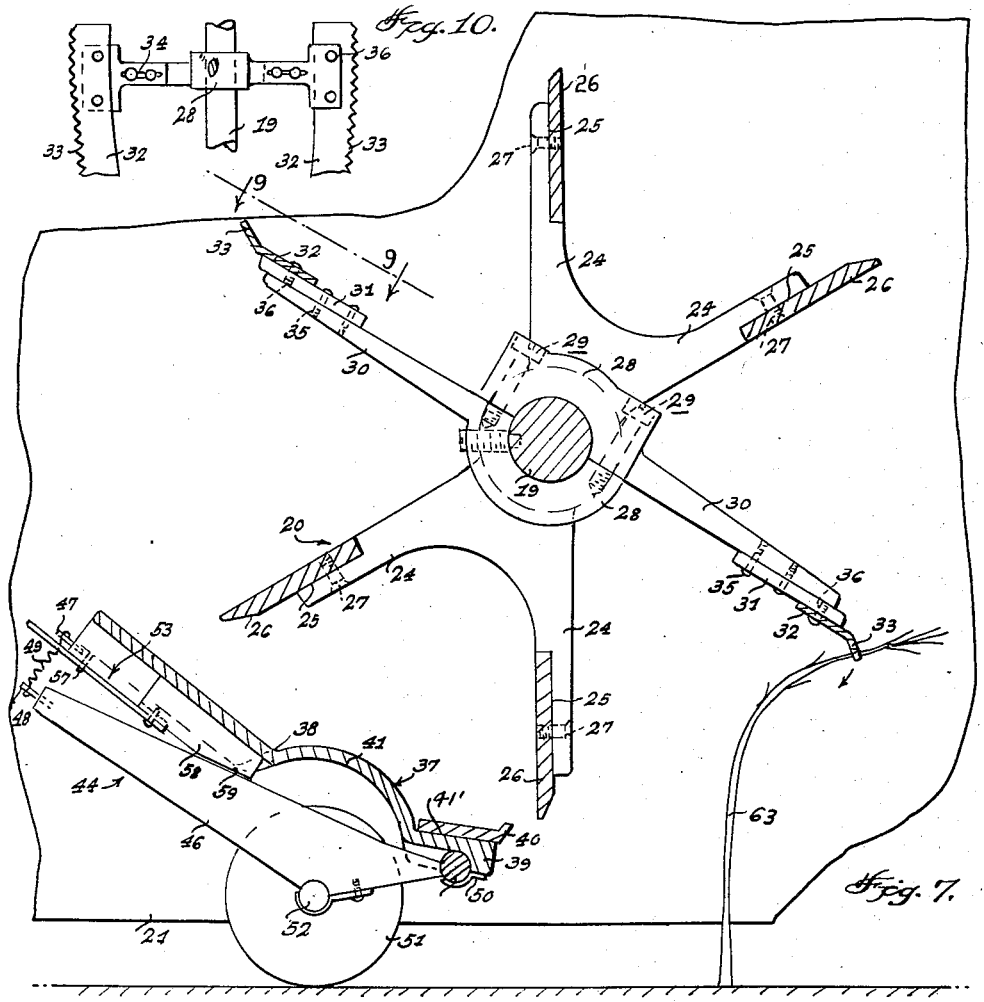
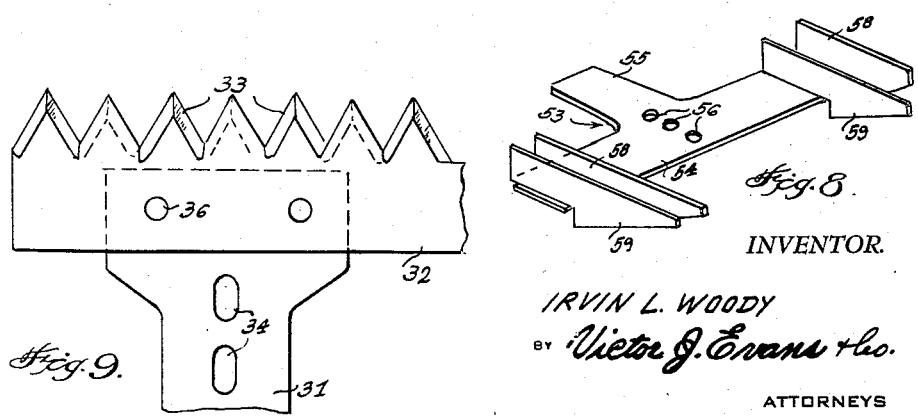
INVENTOR.
IRVIN L. WOODY
BY *Victor J. Evans & Co.*
ATTORNEYS United States Patent Office 2,929,190
Patented Mar. 22, 1960

2,929,190

LAWN MOWER WITH ADJUSTABLE ROLLER

Irvin L. Woody, Quincy, Ill.

Application June 6, 1957, Serial No. 664,027

1 Claim. (Cl. 56—249)

This invention relates to a lawn mower, and more particularly to a reel type of power operated lawn mower.

This invention is an improvement over the power lawn mower shown and described in my prior Patent No. 2,741,890.

The object of the invention is to provide a lawn mower which includes an improved reel structure as well as an improved cutter bar mechanism.

Another object of the invention is to provide a power operated lawn mower which includes a means for bending tall weeds or the like so that such weeds will be directed into the path of the cutting mechanism whereby the weeds can be efficiently and properly cut by the the lawn mower.

Another object of the invention is to provide a reel type power operated lawn mower which includes cutter units that are provided with adjustable rollers, and wherein the reel of the lawn mower includes weeder blades which are adapted to coact with cutting blades and with the cutter bars so that tall grass, weeds and the like can be efficiently severed or cut by the lawn mower.

A further object of the invention is to provide a power lawn mower of the reel type which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view of the lawn mower, constructed according to the present invention.

Figure 2 is an enlarged fragmentary plan view showing the reel structure and cutter units forming a part of the lawn mower of the present invention, with parts broken away.

Figure 3 is an enlarged fragmentary side elevational view showing a portion of the lawn mower, with parts broken away, and with portions in section.

Figure 4 is an enlarged fragmentary elevational view showing portions of the lawn mower disassembled, with parts broken away, and with portions in section.

Figure 5 is an enlarged sectional view taken on the line 5—5 of Figure 2, and showing the parts of one of the cutter units disassembled, and with parts broken away.

Figure 6 is a sectional view taken on the line 6—6 of Figure 5.

Figure 7 is an enlarged vertical fragmentary sectional view illustrating the reel and cutter unit and showing one of the weeder blades bending a weed prior to cutting the weed, and with parts broken away.

Figure 8 is an enlarged perspective view of one of the adjustable plates.

Figure 9 is an enlarged fragmentary plan view showing the mounting for one of the weeder blades, and taken on the line 9—9 of Figure 7.

Figure 10 is a fragmentary plan view, with parts broken away and in section, showing the support for the weeder blades.

Referring in detail to the drawings, the numeral 10 indicates the lawn mower of the present invention, and the lawn mower 10 includes an upper deck or top member 11 which supports a conventional motor 12 thereon, the motor 12 serving to drive a pulley 13. An endless belt 14 is trained over the pulley 13, and the belt 14 is also trained over a pulley 15 which serves to drive a pulley or sprocket 16. A chain 17 engages the sprocket 16, and the chain 17 is also arranged in engagement with a sprocket 18 which is connected to the shaft 19 which forms part of the rotary reel 20.

The lawn mower further includes a pair of spaced parallel vertically disposed side walls 21, ground engaging wheels 22, and a structure 23 which is adapted to be connected to a suitable handle, Figure 1.

Mounted on the shaft 19 are supported members 24 which are provided with recesses or cutouts 25, Figure 7, and reel blades 26 are secured in the recesses 25 in any suitable manner, as for example by means of securing elements 27.

Also mounted on the shaft 19 are clamps 28, and the clamps 28 are secured in place by means of suitable securing elements 29, Figure 7. Arms 30 extend outwardly from the clamps 28, and the arms 30 have shanks 31 adjustably secured thereto. The shanks 31 have weeder blades 32 connected thereto, and the weeder blades 32 are provided with teeth 33, Figure 9. The shanks 31 are provided with slots 34 through which extend the securing elements 35, and due to the provision of the slots 34, the shanks 31 can be adjusted on the arms 30. The weeder blades 32 are connected to the shanks 31 through the medium of securing elements 36.

The lawn mower of the present invention further includes a cutter unit which is indicated generally by the numeral 37, and a cutter unit 37 includes a casing or body member 38 which is provided with a flat surface 39 that has the cutter blade or cutter bar 40 secured thereto. The body member 38 further includes a flat front upper surface or portion 41' and an arcuate or curved section 41 and a rearwardly disposed flange 42. A pair of spaced parallel channels 43 are arranged on opposite sides of the flange 42 for a purpose to be later described.

Operatively connected to the body member 38 is a U-shaped bracket 44 which includes a connecting portion 45 and a pair of spaced parallel legs 46. Lugs 47 extend rearwardly from the body member 38, and also there is provided lugs 48 which extend rearwardly from the connecting portion 45 of the bracket 44. Coil springs 49 extend between the lugs 47 and 48 as shown in Figure 4 for example. Pivot pins 50 serve to pivotally connect the bracket 44 to the body member 38, and a roller 51 is journaled in the bracket 44 by means of a pin or shaft 52.

There is further provided for the cutter unit 37, plates which are indicated generally by the numeral 53, Figure 8, and each plate 53 includes a wide front portion 54 and a rear portion 55 of reduced size. The plate 53 is provided with a plurality of spaced apart openings 56, and a pin 57 is adapted to extend through one of the openings 56 whereby the plate 53 can be adjusted to different positions. A pair of wedge members 58 are secured to the ends of the portion 54 of the plate 53 in any suitable manner, and each of the wedge members 58 is mounted for adjustable or sliding movement in the channel 43 on the body member 38. The wedge members 58 are provided with inclined surfaces 59.

Extending rearwardly from each side of the body member 38 is an arm 60 which is connected to a lug 62 by means of securing elements, the lug 52 being secured to or formed integral with the side walls 21.

From the foregoing, it is apparent that there has been provided a lawn mower which is an improvement over the lawn mower shown and described in my prior Patent No. 2,741,890. In use, a suitable handle can be connected to the structure 23 and the lawn mower is supported by the ground engaging wheels 22 and the rollers 51. The motor engine 12 is of conventional construction, and upon actuation of the engine 12, the pulley 13 is rotated to thereby turn the belt 14 which in turn rotates the pulley 15. This results in rotation of the sprocket 16 and as the sprocket 16 rotates, it moves the chain 17 which turns the sprocket 18, the sprocket 18 being mounted on the reel shaft 19. As the reel shaft 19 moves, it carries a plurality of blades 26 and 32 around therewith and these blades are adapted to coact with the cutting bar 40 so as to cut or sever the grass, weeds or the like.

In Figure 7 the numeral 63 indicates a weed which is being cut by the lawn mower of the present invention, and it will be seen that the weeder blades 32 will engage or strike the weed 63 to bend it over so that the cutting blades 26 can then sever or cut the weeds 63 as the cutting blade 26 moves into a position contiguous to the cutting bar 40. The weeder blades 32 are connected to the shanks 31, and the shanks 31 are connected to the arms 30 which extend outwardly from the clamps 28, the clamps 28 being mounted on the reel shaft 19. Due to the provision of the slots 34 in the shanks 31, it will be seen that the shank 31 and weeder blade 32 can be moved to different adjusted positions. Also, by manually gripping the portion 55 of the plate 53, the plate 53 can be moved so that the pin 57 can be arranged in engagement with different of the openings 56. As the plate 53 moves, the pair of wedge elements 58 will be adjusted or moved in the channels 43 so that the inclined surfaces 59 will permit the coil springs 49 to hold the brackets 44 in different adjusted positions. Since the rollers 51 are carried by and journaled in the brackets 44, it will be seen that this adjustment of the brackets 44 permits adjustment of the rollers 51.

The lawn mower of the present invention thus includes an improved cutter bar or cutter unit and due to the provision of the construction of the cutter unit including the adjustable plate 53, the rollers 51 can be raised or lowered since the rollers are journaled in the yokes or brackets 44 and this bracket 44 can be raised or lowered to release the tension of the coil springs 49, and when the plate 53 has been moved to the desired position, the pin 57 will extend through one of the openings 56 so as to maintain the parts immobile in their adjusted position. The rollers can be easily cleaned by raising the rollers 51. Furthermore, in the present invention the drive wheels are located behind the cutter bar and inside of the cut area as the mower moves forward and this prevents the mower wheels from mashing grass down before the cutting edge can reach the grass. The rollers 51 are located under and behind the cutting edge of the cutting bar and these rollers serve the purpose of supporting the cutting bar or cutting unit and also provide a means for adjusting the height of the cutting edge. The rollers 51 serve to help support the mower and these rollers travel behind the outer ends of the cutter units 37.

As shown in Figure 9 for example, the weeder blade 32 has the teeth 33 which has bevels on opposite sides of every other tooth so as to cause the teeth to twist or grasp the weeds as they are struck at high velocity as shown in Figure 7 for example, so that the weeds 63 will be jerked or moved down to where the cutting blades 26 and 40 can cut such weeds in the usual manner. This is especially important when cutting tall weeds or tall grass. Thus, the weeder blade 32 grips and bends the tall weeds 63 down to where the cutter blades can cut them off and this is an advantage over conventional cutting blades which merely pass over tall weeds and fail to cut them off.

The weeder blades can be made in one piece or else the weeder blades can be made in sections so that they can be used on old lawn mower reels as an attachment. The weeder bars or weeder blades are arranged parallel with the reel blades 26 and have the same curvature from end to end.

The teeth on the weeder blades travel in a slightly smaller arc than the cutter blades 26 but the sharp impact of the weeder blades 32 serves to catch the high weeds and mash them down within reach of the cutter blades and this keeps the mower from running over the weeds which again rise up after the mower has passed thereover. Such tall weeds are usually unharmed by the ordinary mower and this is not good with weeds such as plantain since these die out if cut off and are not allowed to go to seed. The weeder blades 32 are similar to a saw blade and are curved so that the sharp V-shaped slots or teeth 33 do not necessarily cut the weed off but merely or mainly pull the weeds down to the cutter blades so that the cutter blades can cut them off. The number of blades can be varied as desired as long as the reel is balanced. The lawn mower is further provided with a plurality of spacer bars 64, Figure 2.

In the cutter unit, the bar and casting are formed in a single unit which runs the full width of the mower and the cutter unit pivots in the side frames or side walls 21 on the pivot pins 65.

After the adjustment of the plate has been made, the springs serve to hold or retain the parts in adjusted position and this adjustment can be made easily and quickly without requiring any tools. The lawn mower may either be hand pushed or power propelled and if desired a suitable clutch mechanism may be utilized. The arms 60 permit adjustment for closeness or pressure of the reel blades against the cutter bar edge, since the adjustability of the arms 60 permits the cutter bar to be adjusted towards or away from the reel blades. The lug 62 is provided with a punched hole or opening 66 and a threaded hole 67, Figure 3. In the threaded hole 67, there is arranged a screw 68 which works in conjunction with a bolt 69. Since the screw 68 is threaded into the hole 67, it will be seen that by turning the screw 68, the arm 60 will be moved towards or away from the adjacent lug 62. As shown in Figure 3 for example, the lower end of the screw bears against the lug 62.

I claim:

In a cutter unit for a lawn mower, a body member including an upper front surface, an arcuate section arranged rearwardly of said front surface and terminating in a rear flange, there being spaced parallel channels in said body member on opposite sides of said flange, a U-shaped bracket including a pair of spaced parallel legs and a connecting portion, pins pivotally connecting said legs to said body member, a roller journaled in said bracket, lugs extending rearwardly from said body member and from the connecting portion of said bracket, coil springs extending between the lugs on the connecting portion and the lugs on the body member and connected thereto, a plate movably mounted between said bracket and body member and said plate including a wide main portion and a rearwardly extending portion of reduced size, there being a plurality of spaced apart openings in said plate, a pin depending from said body member for engagement with one of the openings in said plate, and a pair of spaced parallel wedge members secured to said plate and said wedge members being mounted for adjustable movement in said channels.

References Cited in the file of this patent

UNITED STATES PATENTS

| | | |
|---|---|---|
| 1,034,309 | Scharnaveber | July 30, 1912 |
| 1,662,849 | Dailey | Mar. 20, 1928 |
| 2,056,369 | Roessel | Oct. 6, 1936 |
| 2,487,927 | Isaacs | Nov. 15, 1949 |
| 2,515,556 | Hartling | July 18, 1950 |
| 2,741,890 | Woody | Apr. 17, 1956 |